Feb. 21, 1939.   J. H. DEVINE   2,147,886
LUNCH BOX
Filed Nov. 5, 1934   4 Sheets-Sheet 1

Inventor:
James H. Devine
By: Brown, Jackson, Boettcher & Dienner
Att'ys

Feb. 21, 1939. J. H. DEVINE 2,147,886
LUNCH BOX
Filed Nov. 5, 1934 4 Sheets-Sheet 2
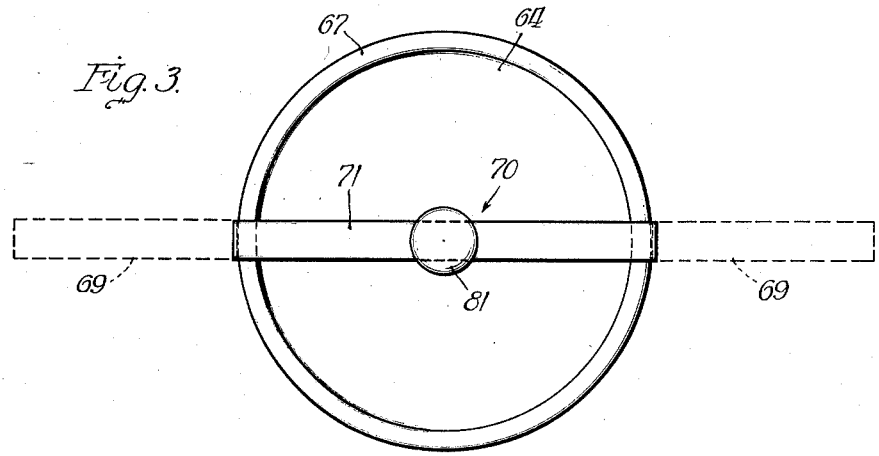
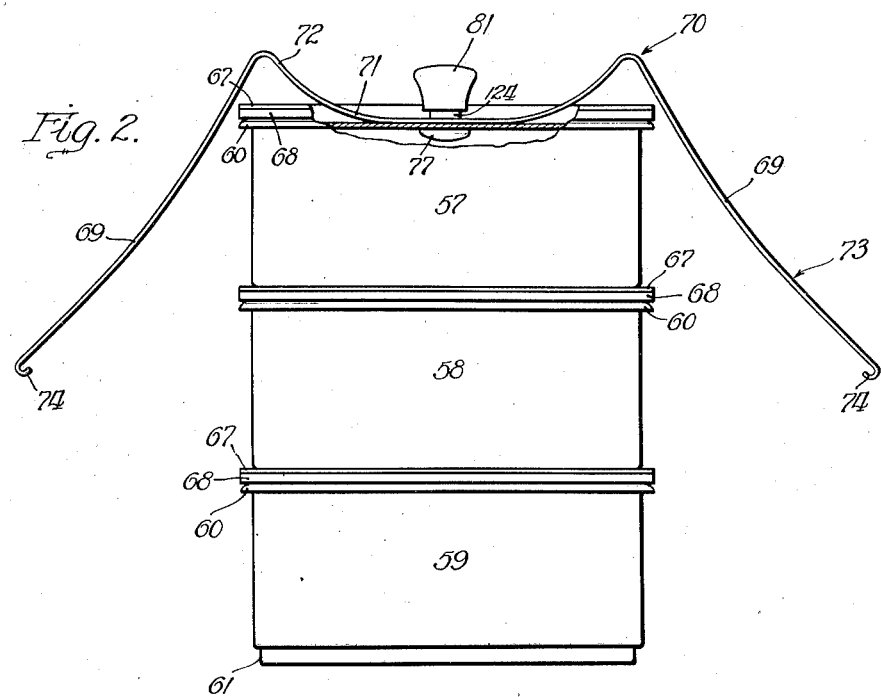
Inventor:
James H. Devine
By: Brown, Jackson, Boettcher & Dienner,
Attys.

Feb. 21, 1939.  J. H. DEVINE  2,147,886
LUNCH BOX
Filed Nov. 5, 1934  4 Sheets-Sheet 3
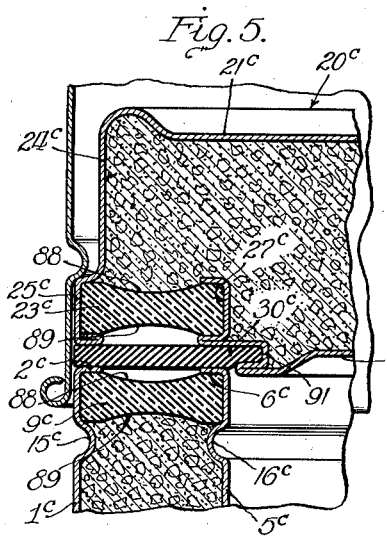
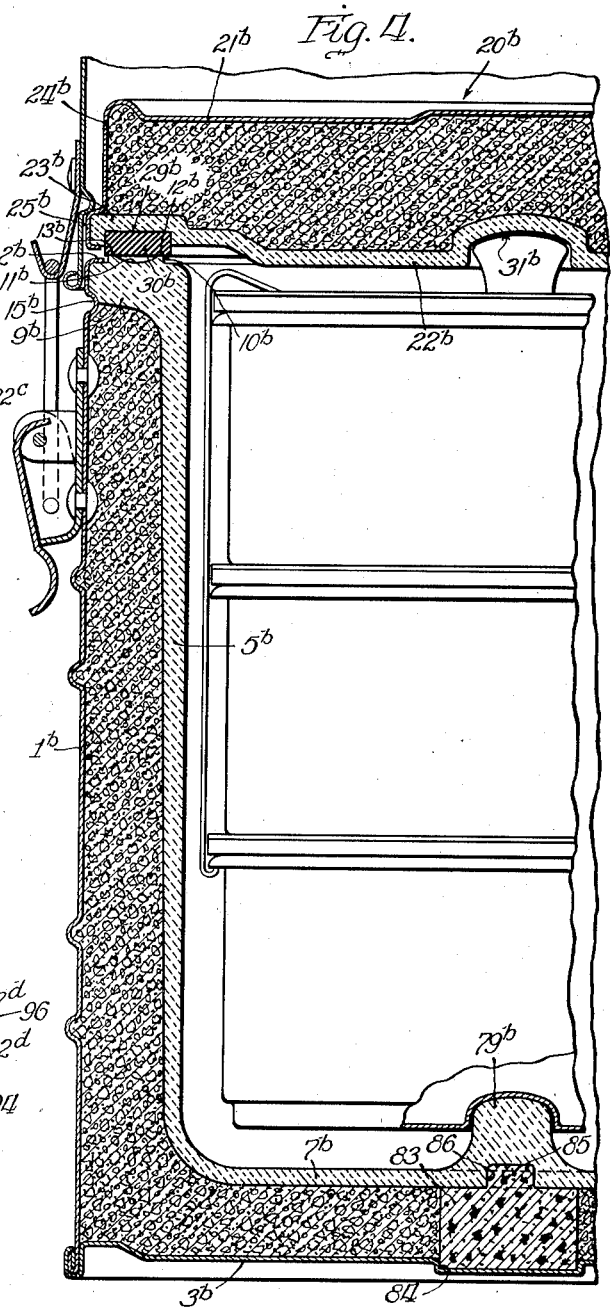
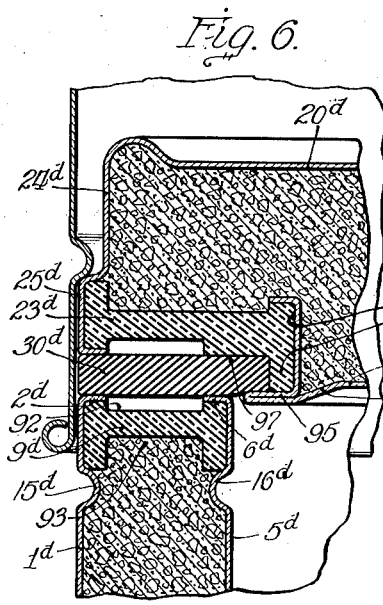
Inventor:
James H. Devine
By: Brown, Jackson, Boettcher & Dienner
Attys.

Feb. 21, 1939. J. H. DEVINE 2,147,886
LUNCH BOX
Filed Nov. 5, 1934 4 Sheets-Sheet 4
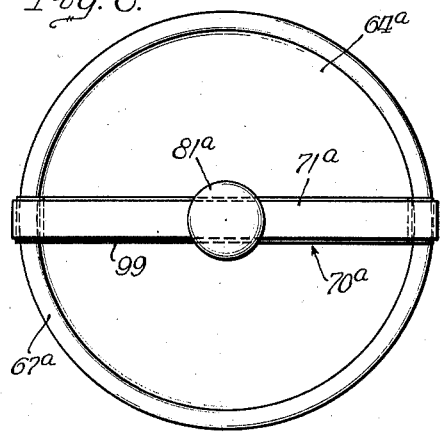
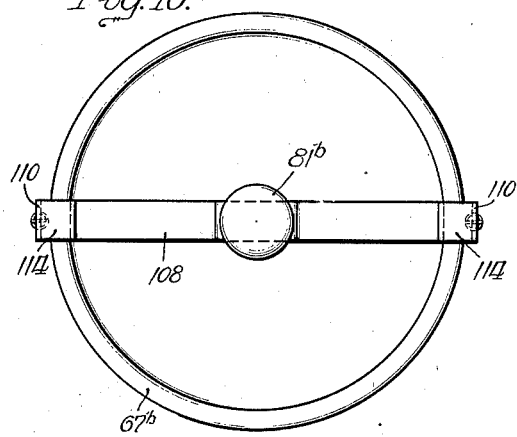
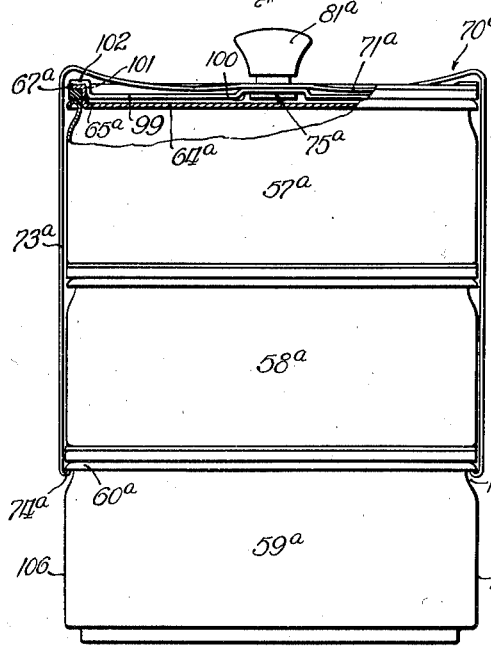
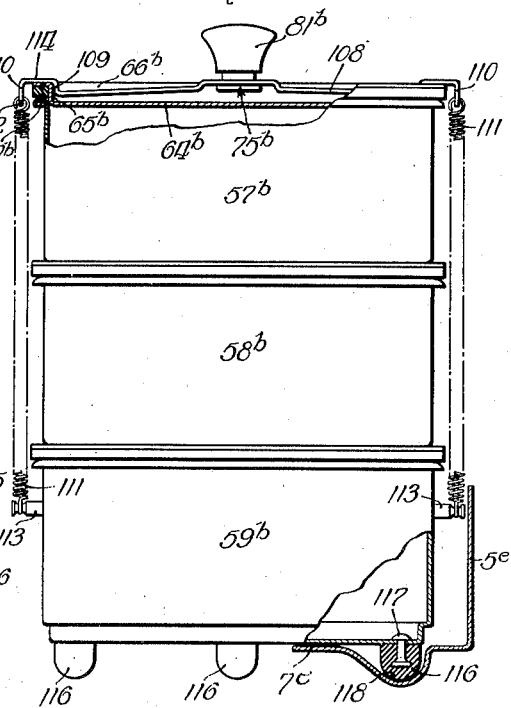
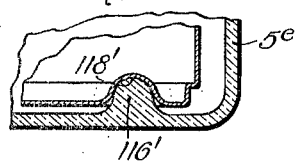
Inventor:
James H. Devine
By: Brown, Jackson, Boettcher & Dienner,
Attys.

Patented Feb. 21, 1939

2,147,886

UNITED STATES PATENT OFFICE 2,147,886

LUNCH BOX

James H. Devine, Ste. Genevieve, Mo., assignor to Dev-Insular Company, St. Louis, Mo., a corporation of Missouri Application November 5, 1934, Serial No. 751,519

10 Claims. (Cl. 206—4)

This invention relates to containers for comestibles, and more particularly to lunch boxes that are thermally insulated in such manner as to retain comestibles in either a hot or cold condition.

Briefly, the type of device to which this invention pertains, comprises an outer casing, an inner casing thermally insulated from the outer casing, and a plurality of superposed food tanks which are disposed within and held in spaced relation to the inner casing and thermally insulated therefrom.

Broadly stated, the chief object of the present invention is to provide a device of the character described having high thermal efficiency, so that the conduction of heat from the plurality of food tanks will be reduced to a minimum. Another broad object of the invention is to provide a device of the character described wherein the various foods carried thereby will each retain its own individual flavor and without danger of the odors of the foods mixing and contaminating the other foods.

More specifically, it is one of the objects of the present invention to provide means for rigidly supporting and positioning the inner casing within and centrally of the outer casing and thermally insulating it therefrom. In certain forms of the device, both the inner and outer casings are formed of metal and the supporting and positioning means comprises a collar formed of a suitable heat insulating material. This collar is normally separate from but is disposed between the inner and outer casings and rigidly secured thereto. In another form of the device, the outer casing is formed of metal and the inner casing is formed of a suitable heat insulating material. In such case, the collar is formed integrally with the inner casing, and is rigidly secured to the outer casing in any suitable or preferred manner.

Another object of the present invention resides in the provision of means for yieldingly clamping all of the superposed food tanks together. This clamping means serves to prevent the closure members of the food tanks from being raised off of said tanks by reason of the expansion of any air entrapped therein, and also serves as a handle to facilitate the insertion of or the removal of the food tanks, as a unit, into or from the inner casing respectively. In certain forms, this clamping means comprises an inverted U-shaped strap, the transverse portion of which extends across the top of the uppermost food tank, and the legs of which are each provided with an inturned flange or hook, this flange being adapted to engage beneath a down-turned flange formed on the lowermost food tank. In another form, this clamping means comprises a strap which seats on and extends across the closure member of the uppermost food tank. The outer ends of this strap each have one end of a helical spring attached thereto, and, at their outer ends, these springs are adapted to engage studs or bosses secured to and extending outwardly from the side walls of the lowermost food tank.

Another object of the present invention is to provide yieldable insulated point contact means for holding the food tanks in spaced relation to the inner casing, so that the point of contact therebetween will be reduced to a minimum, thus greatly reducing conduction of heat between the tanks and the inner casing. In one form of the device the food tanks are supported within the inner casing and insulated from the bottom and side walls thereof by a single centrally located point of support. In this form of the device the food tanks are insulated and yieldably supported out of contact with the top of the inner casing and the closure member therefor, by cooperating means formed on the aforementioned clamping means and the closure member, which means is also in the nature of a single insulated point of support. In another form of the device the lowermost food tank is provided with a plurality of insulated feet which seat on the bottom wall of the inner casing. The food tanks, in this form of the device, are also insulated and supported out of contact with the top of the inner casing and the closure member therefor by a single insulated point of support, as above described.

Still another object of the invention resides in the provision of a new and improved fastening means for securing the cover of the lunch box to the outer casing.

A further object of the invention resides in the provision of a device of the character described that is highly sanitary, and one in which the removable parts thereof can readily be assembled or disassembled.

Other objects and advantages of the invention will appear from the following detailed description when taken in connection with the accompanying drawings, in which:

Figure 2 is a front elevational view, partly in section, of the stacked food tanks and the clamping means therefore, the said clamping means being shown in released position;

Figure 3 is a top plan view of the device of Figure 2;

Figure 4 is a fragmentary vertical sectional view of a modified form of lunch box;

Figure 5 is a fragmentary vertical sectional view of modified forms of collars for the inner and outer casing and for the closure member, and also shows a modified manner of securing the closure member gasket thereto;

Figure 6 is a view similar to Figure 5 showing other modified forms of collars for the inner and outer casings and for the closure member and showing another manner of securing the gasket to the closure member;

Figure 7 is a front elevational view of the superposed food tanks, partly in section, showing a modified form of clamping means applied thereto;

Figure 8 is a top plan view of the device of Figure 7;

Figure 9 is a front elevational view of the superposed food tanks, partly in section, showing a third form of clamping means applied thereto;

Figure 10 is a top plan view of the device of Figure 9; and

Figure 11 is a fragmentary vertical sectional view of a modified form of supporting means for the food tanks.

Figure 1:
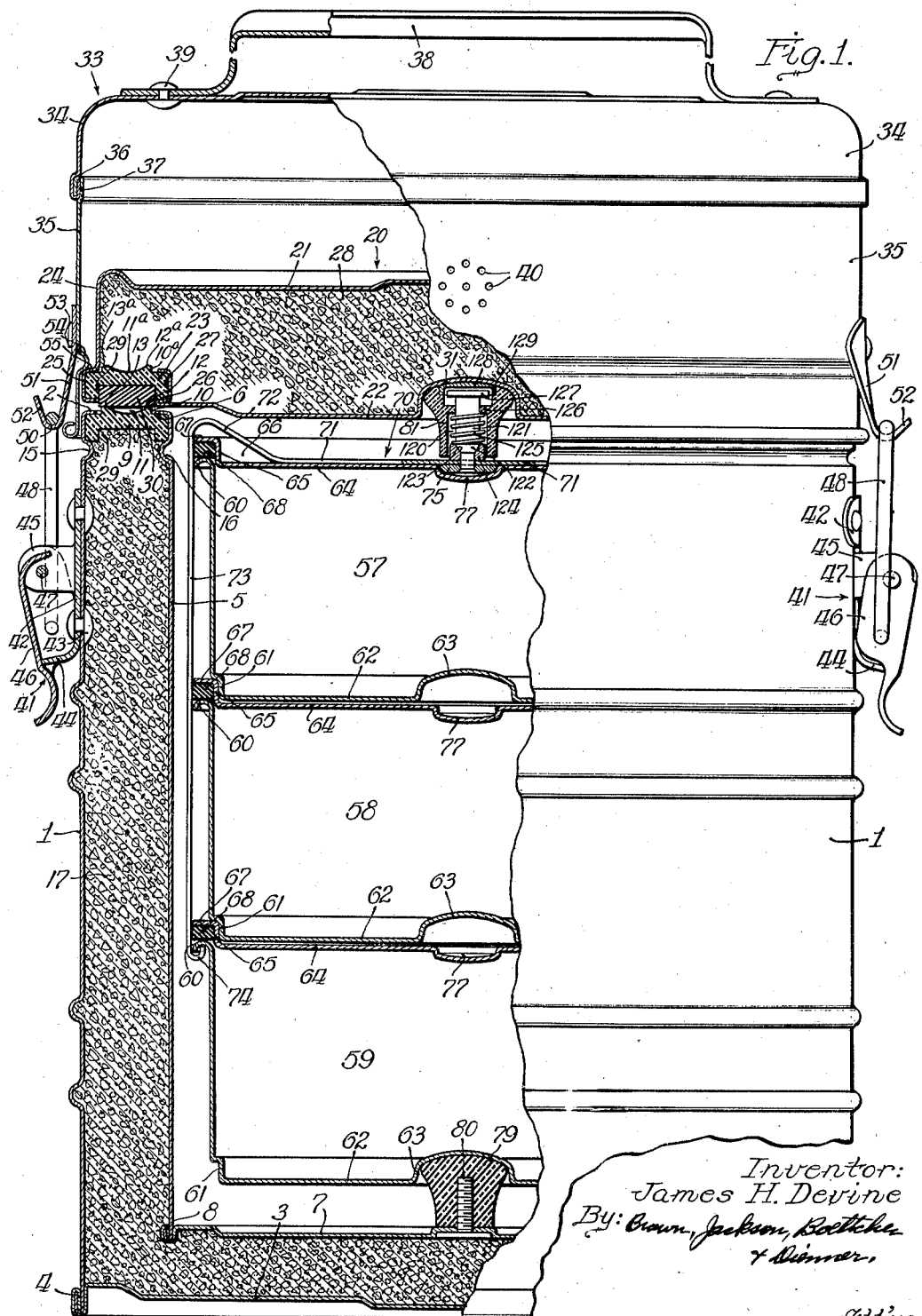
Figure 1 is a front elevational view partly in section of a lunch box embodying the principles of the present invention.

In constructing a lunch box according to my invention, I provide an outer casing 1 of generally cylindrical shape, although it may be constructed in any desired form without departing from the spirit of the present invention. This casing may be formed of any suitable material, although I preferably use sheet aluminum or tin. The outer surface of the casing may be painted or finished in any suitable manner or, if desired, the outer surface of the casing may be covered with leather, or other suitable material, so as to present an attractive appearance. At its upper end, casing 1 is open and the marginal edge thereof is provided with an inwardly extending annular flange 2, while at its lower end the casing is closed by a bottom wall 3 and has its lower marginal edge bent outwardly and upwardly to form a channel 4. The marginal edge of the bottom wall 3 of casing 1 is bent about channel 4 and extends downwardly thereinto, as shown, thereby forming a seam for securing the bottom wall 3 to the casing.

Within the casing 1, I dispose an inner casing in the form of a liner 5, preferably formed of tin or aluminum. This casing or liner is spaced from the outer casing and has its upper marginal edge bent outwardly to form an outwardly extending annular flange 6. At its lower end, liner 5 is provided with a bottom wall 7, which wall may be seamed to the liner as indicated at 8 in substantially the same manner as the bottom wall 3 is seamed to the outer casing 1.

At its upper end, liner 5 is spaced apart and firmly secured to outer casing 1 by means of a collar 9. This collar may be formed of any suitable heat insulating material and is of such size as to have a snug fit with the inner surface of the side wall of outer casing 1 as well as a snug fit with the outer surface of liner 5. The upper surface of collar 9 is provided with an upwardly projecting boss 10, which boss is recessed as indicated at 11 to form inner and outer ridges 12 and 13, respectively, the purpose of which will hereinafter be explained. As shown, the portion of the upper surface of the collar, which is disposed between the outer peripheral edge thereof and boss 10, abuts the undersurface of the inturned flange 2 and the outturned flange 6, on the casing and liner, respectively. The collar is secured to these flanges by any suitable adhesive. Preferably, outer casing 1 is provided with an inwardly pressed bead 15, and liner 5 is provided with an outwardly pressed bead 16.

These beads extend inwardly for a short distance beneath the collar and serve to prevent downward movement of said collar with respect to said casing and liner. The space 17 between the outer casing and the liner is preferably filled with a suitable heat insulating material, such as granulated cork. In addition to serving as an insulating medium, this cork serves to support the bottom of the liner and to restrain lateral movement of said liner with respect to said outer casing.

In assembling the device, beads 15 and 16 are first formed in the outer and inner casing, respectively. Collar 9 is then seated on these beads, after which flanges 2 and 6 of the casing and liner, respectively, are rolled over the collar and cemented thereto. The granulated cork is then poured into space 17 between the inner and outer casings after which bottom wall 3 may be seamed to the outer casing 1, in the manner previously described.

A closure member, designated generally by the reference character 20, is associated with collar 9 and serves to thermally insulate the open upper end of liner 5 from the atmosphere and from the outer casing 1. This closure member is in the form of an inverted cup 21, being closed by a bottom wall 22 secured to cup 21 by a collar 23. Cup 21 and bottom wall 22 are preferably formed of tin or aluminum, while collar 23 is preferably formed of a suitable heat insulating material. As shown, side wall 24 of cup 21, adjacent its peripheral edge, is bent outwardly and downwardly and then bent inwardly to form a channel 25, while bottom wall 22 has its peripheral edge bent back upon itself, as indicated at 26, which bent back portion is then bent upwardly and outwardly to form a channel 27. Collar 23 is adapted to engage in channels 25 and 27 of cup 21 and bottom wall 22, respectively, and is secured therein by any suitable adhesive, thereby securing bottom wall 22 to cup 21. The space 28 enclosed by cup 21 and bottom wall 22 is preferably filled with a suitable heat insulating material, such as granulated cork.

For the sake of convenience in manufacturing, collar 23 has been made substantially similar to collar 9. Collar 23, therefore, also includes the boss 10a, having the depressed portion 11a, forming the inner and outer ridges 12a and 13a, respectively. On its under surface, both collars 9 and 23 are provided with a recess 29. In collar 23, recess 29 is adapted to receive a gasket 30, which gasket is adapted to have a friction fit within the recess. When closure member 20 is placed in position on the lunch box, this gasket seats on the ridges 12 and 13 of collar 9, thereby forming a double seal with said collar. It will also be noted that bottom wall 22 of closure member 20 is provided with a centrally located recess 31, the purpose of which will hereinafter be explained.

The open end of outer casing 1 is closed by a cover 33, preferably formed of tin or aluminum. This cover is preferably formed of two sections, the upper section being in the form of an inverted cup 34 and the lower section being in the form of an annular ring 35. Cup 34 is joined to ring 35 by means of a seam, which seam is formed by bending the upper peripheral edge of ring 35 outwardly and downwardly to form a channel 36 and by then extending the peripheral edge 37 of cup 34 into said channel. The cover is provided with a handle 38, which is secured to said cover as by means of rivets 39, and is of such height that when placed in position on said lunch box, there will be sufficient space between the top wall of said cover and the top wall of closure member 20 to permit of articles of food, such as pies, cakes, bread or the like, being placed upon said closure member. Vent holes 40 are preferably formed in ring 35 of the cover to permit of circulation of air therethrough.

Cover 33 is secured to outer casing 1 by means of fastening devices, indicated generally at 41. These fastening devices comprise a metal plate 42, secured to outer casing 1 as by means of rivets 43, the lower edge of said plate being bent outwardly away from casing 1, as indicated at 44. Extending outwardly at substantially right angles to plate 42, is an ear or lug 45, which is formed integrally with said plate, this ear or lug having one end of a lever 46 pivotally secured thereto at 47. Lever 46 has one end of a bail 48 pivotally secured thereto, the pivotal point of connection of said bail with said lever being below and in a plane disposed between the outer casing 1 and the pivotal point of connection of said lever with said ear, when said lever is in the position shown in Figure 1. At its upper end, the bail 48 engages in a recess 50, which is formed in a plate 51 by turning the lower edge upwardly as indicated at 52. This plate is suitably secured to cover 33 as by means of rivets 53. The outwardly turned portion 44 of plate 42 is adapted to engage the inner surface of lever 46 and thereby limit inward movement of said lever with respect to casing 1. This prevents lever 46 from snapping against and damaging said casing. It will be noted that ring 35 of cover 33 is provided with an inwardly pressed bead 54. When the cover is placed in position upon the lunch box, this bead 54 is adapted to seat on shoulder 55, formed by the channel 25 of closure member 20. The downward pressure exerted upon cover 33 by fastening devices 41, will, therefore, be transmitted to closure member 20 thereby assuring that such closure member will be firmly pressed downwardly upon collar 9 to assure a steam-tight fit therewith.

Disposed within the inner liner 5 are a plurality of containers or food tanks 57, 58 and 59. These tanks may be constructed of any suitable material, depending largely upon the characteristics of the substance to be placed in the tank. Under ordinary conditions, these tanks may be constructed of sheet aluminum. Each of the tanks, adjacent their upper open end, are rolled outwardly to provide a downwardly extending annular flange 60, and adjacent their lower end are reduced in diameter to provide a shoulder 61. The bottom wall 62 of each of the tanks is also provided with an upwardly pressed portion forming a recess 63.

A closure member 64 having upwardly extending side walls 65 forming a depression 66 is provided for each of the tanks. The side walls of the closure member are adapted to extend downwardly into the tank in abutting relation to the inner surface of the side walls of the tank and to have a snug fit therewith. The marginal edges of the walls 65 are turned outwardly to form a flange 67. A gasket 68 embraces side walls 65 of cover members 64 and abuts against the under surface of flange 67 of said cover members. This gasket is preferably formed of rubber, or any other resilient heat insulating material, and is adapted to seat upon flange 60 of the food tanks, and to provide a steam-tight fit between the tank and the closure member. The tanks are adapted to be stacked one upon the other, as shown, with the shoulder 61 of one tank disposed in the depression 66 of the closure member of the tank upon which it is stacked. The shoulder 61 seating within the depression 66 serves to prevent sliding movement of said tanks off of each other, and thereby serves to prevent disarrangement of said tanks within the liner 5. The gaskets 68, as well as the tanks and the closure members therefor, are of symmetrical construction and are each readily interchangeable with each other.

It has been found that when the food tanks 57 to 59, inclusive, are filled with hot food and permitted to remain in the inner liner 5 for any period of time, that the closure members of said tanks have a tendency to raise off of the tanks, thereby permitting escape of steam into the space between the tanks and the inner liner and impairing the insulating value of such space. The reason for the closure members raising out of their respective tanks has been attributed to the fact that when the closure members are placed on the tanks a certain amount of air is entrapped and compressed therein. This entrapped air is heated by the hot food, which expands the air and builds up a pressure in the tank with the result that the closure members are raised off of the tanks. In order to overcome this difficulty and to assure a positive air-tight fit of the closure members with their respective tanks, I have provided suitable means for clamping the tanks together. Such means comprises a strap 70 of inverted U-shaped formation. This strap is preferably formed of spring steel and the transverse portion 71 thereof, is adapted to seat on and extend across the closure member of the top-most food tank. The transverse portion of strap 70, adjacent the outer ends thereof, is bent upwardly for a short distance as indicated at 72 and is then bent downwardly to form the legs 73 of the clamp. Legs 73 are preferably slightly curved outwardly as shown at 69. At their extreme ends, legs 73 are each provided with an upturned flange 74, which flange is adapted to engage beneath the flange 60 of the lowermost food tank. Lateral movement of strap 70 with respect to the food tanks is prevented by a washer 75, which is carried by strap 70, in a manner hereinafter more fully described, seating in a depression 77 formed in cover 64 of the food tank. Each of the covers 64 of the food tanks 57 to 59, inclusive, is provided with the depression 77 so that these covers may be interchangeable with the tanks. When the tanks are clamped together, as shown in Figure 1 of the drawings, and it is desired to remove the clamp from the tanks, it is merely necessary to exert a downward pressure on the upturned portion 72 of the clamp, thereby moving legs 73 of the clamp downwardly until flange 74 clears flange 60 of the tanks, at which time the clamp, due to the outward curvature of legs 73, will spring to the position shown in Figure 2 of the drawings, and the clamp may then be lifted off of the tanks. When it is desired to apply the clamp to the tanks, the clamp is placed upon the closure member of the topmost food tank and with washer 75 seated in the depression 77 of said closure member, at which time the clamp will assume the position shown in Figure 2 of the drawings. By then exerting downward pressure on portion 72 of the clamp and by pressing the legs 73 thereof inwardly toward the tanks, flanges 74 of the clamp will be disposed beneath flange 60 of the lowermost food tank, and upon release of pressure upon portion 72 of the clamp the legs 73 will move upwardly and engage flanges 74 beneath flanges 60 of the tank.

The food tanks are disposed within and spaced from the walls of liner 5 by means of two centrally located points of support. One of these points of support is located adjacent the bottom of the stacked tanks while the other point of support is located at the top of the tanks. The lower support comprises a knob 79 which seats on and is rigidly secured to bottom wall of liner 5 by means of a machine screw 80. Knob 79 is preferably formed of a suitable heat insulating material and, as shown, projects into depression 63 formed in the bottom wall of food tank 59. The food tanks are supported out of contact with the bottom wall 7 of liner 5 by knob 79 and, by reason of knob 79 projecting into recess 63 of food tank 59, lateral movement of said tank with respect to said liner is prevented, and the tanks are, therefore, also held out of contact with the side wall of the liner.

The uppermost food tank 57 and the clamping means 70 are supported out of contact with liner 5 by means of a knob 81. This knob is preferably formed of a suitable heat insulating material and is provided with a central longitudinal bore 120 for the reception of a shaft 121, the knob being mounted upon the shaft for vertical sliding movement relative thereto. At its lower end shaft 121 is provided with a conical portion 122 which is adapted to seat in a conical recess 123 formed in a bushing 124. Bushing 124 seats on transverse portion 71 of clamping means 70 and shaft 121 extends through said bushing and clamping means and through washer 75, disposed in abutting engagement with the underside of transverse portion 71 of the clamping means, to which it is suitably secured, as by riveting, or in any other suitable or preferred manner. Washer 75 prevents upward movement of shaft 121 with respect to the clamping means, while conical portion 122 of shaft 121, seating in the conical recess 123 of bushing 124, prevents downward movement of the shaft, so that said shaft is held rigid with respect to the clamping means. Bushing 124 serves as a guide for the lower end of knob 81, and also serves as a seat for one end of a compression spring 125 which embraces shaft 121. The opposite end of this spring abuts against a ring 126, which projects inwardly from the walls of bore 120 of knob 81, and normally tends to urge said knob upwardly with respect to said shaft. Ring 126, which has a sliding fit with shaft 121, serves as a guide for the upper portion of knob 81 and, in addition, is adapted to engage the under surface of an enlarged head 127 formed on the upper end of shaft 121, and thereby serve as a stop for limiting the upward movement of said knob with respect to said shaft. The open upper end of knob 81 is closed by a cap 128, which has a friction fit with the side walls of bore 120 and seats on a shoulder 129 formed in bore 120.

In assembling this device, shaft 121 is first passed through the open upper end of knob 81, after which compression spring 125 is slipped about said shaft and upwardly into said knob through the lower end thereof. Shaft 121 is then passed through bushing 124, transverse portion 71 of clamping means 70, and through washer 75, after which it is riveted thereto. Cap 128 may now be put in place upon the upper end of the knob.

As shown, knob 81 is adapted to project into recess 31 formed in the bottom wall of closure member 20, and thereby hold the food tanks and clamping means 70 from moving laterally into engagement with the side walls of the liner, as well as into contact with closure member 20. This knob also serves as a handle for clamping means 70 to facilitate inserting or removing the stacked tanks, as a unit, into or from liner 5. In addition to the above, the knob serves as a yieldable support for the stacked food tanks and compensates for any wear of the gaskets 68 of the food tanks. As the gaskets wear, the knob 81 will move upwardly with respect to shaft 121, under action of spring 125, and always maintain a snug fit in the recess 31 of the closure member. This prevents rattling of the food tanks within the liner. If desired knob 79, secured to bottom wall 7 of liner 5, may be constructed similarly to knob 81, thereby forming two central yieldable points of support for the stacked food tanks.

In Figure 4 I have shown a modified form of the device of Figure 1. In this form of the device, the outer casing 1b is also formed of tin or aluminum, and the outer surface thereof may be finished in any appropriate manner. The inner liner 5b, however, in the instant case, is preferably formed of a suitable heat insulating material, such, for example, as "Bakelite" or "crockery", and the collar 9b is formed integrally therewith. The upper surface of collar 9b is also provided with a boss 10b, the depressed portion 11b forming the inner and outer ridges 12b and 13b, respectively, and the outer casing is provided with the inturned flange 2b and the impressed bead 15b for the purposes hereinbefore described in connection with the device of Figure 1. It is contemplated employing air or granulated cork as the heat insulating medium between the inner and outer casing in this form of the device. Preferably the lower end of the liner is suported by suitable supporting means 83. This supporting means is preferably formed of a suitable heat insulating material and, as shown, seats in a depression 84 formed in the bottom wall 3b of outer casing 1b. This prevents lateral movement of the supporting means with respect to the outer casing. If desired, the supporting means 83 may be formed integrally with the bottom wall 7b of the liner 5b, or the supporting means may be provided with an upstanding ear or lug 85 for engagement in a recess 86 formed in bottom wall 7b of the liner.

The closure member 20b of the instant form of the device is similar to the closure member of the device of Figure 1 in that it comprises an inverted cup member 21b having a channel 25b formed in the side wall 24b thereof. This cup member is preferably formed of tin or aluminum. The bottom wall 22b is, however, in the present instance, formed of a suitable heat insulating material, such, for example, as "Bakelite" or "crockery", and the collar 23b is formed integrally therewith. The upper surface of this collar is planar and is not provided with the depressed portion 11a and the inner and outer ridges 12a and 13a, respectively, of the collar 23 of the device of Figure 1. The collar is, however, provided with the recessed portion 29b on its under surface thereof, for the reception of the gasket 30b. As shown, this collar extends into the channel 25b of side wall 24b of cup member 21b and is suitably secured therein by a suitable adhesive. The under surface 22b is also provided with a recess 31b for the same purpose set out in connection with the device of Figure 1. The construction of the food tanks, the clamping means, and the method of supporting the food tanks out of contact with the closure member and the side wall of the liner is substantially the same as that set out in connection with the device of Figure 1. The knob 79b, for supporting the lowermost tank out of contact with the bottom and side wall of the liner, has, however, in the instant case been formed integrally with the bottom wall 7b of liner 5b.

Figure 5 shows a modified form of collar for use in connection with the device of Figure 1, and also shows a modified manner of securing the closure member gasket thereto. As shown, the collars 9c and 23c are of similar construction and are readily interchangeable with each other. Each of the collars has its upper and lower surface concaved as indicated at 88 and 89, respectively. Collar 9c is disposed and held in position between outer casing 1c and inner liner 5c by the inturned flange 2c and the inwardly pressed bead 15c, of outer casing 1c, and the outwardly turned flange 6c and the outwardly pressed bead 16c of the inner liner 5c. The closure member in this form of the device, comprises the inverted cup shaped member 21c, having the channel 25c formed in the side wall 24c thereof. The bottom wall 22c of the closure member differs slightly in construction from the closure member of Figure 1, in that the peripheral edge of such bottom wall is bent backwardly upon itself and then upwardly and forwardly to form a channel 91, and this forwardly extending portion is then again bent backwardly upon itself and upwardly and forwardly to form a second channel 27c, which corresponds to the channel 27 of bottom wall 22 of Figure 1. The channel 91 is adapted to receive and clamp gasket 30c therebetween, and collar 23c is received and held in channels 25c and 27c of the cup member 21c and bottom wall 22c, respectively.

Figure 6 shows still other forms of collars for the closure member, and for the inner and outer container, and also a modified method of clamping the gasket to the closure member. In this form of the device the outer casing 1d is provided with the inwardly pressed bead 15d and the inturned flange 2d and the inner liner is provided with the outwardly turned flange 6d and outwardly pressed bead 16d. Collar 9d is preferably formed of a suitable heat insulating material and is preferably recessed at its upper and lower surfaces, as indicated at 92 and 93, respectively. The collar is held between the outer casing 1d and inner liner 5d in the manner set out in connection with the device of Figure 1.

The closure member 20d also comprises the channel 25d formed in the side wall 24d thereof. As shown, bottom wall 22d, in the instant case, is bent downwardly as indicated at 94 and is then bent forwardly and backwardly upon itself as indicated at 95 and such bent back portion is then bent upwardly and forwardly to form the channel 27d. Collar 23d is preferably of the form shown, and is held within channel 25d of closure member 20d and channel member 27d of bottom wall 22d. Collar 23d preferably has a downwardly extending flange 96 and, as shown, the bent back portion 95 of bottom wall 22d extends forwardly of said flange. Gasket 30d is clamped between said bent back portion 95 of bottom wall 22d and the undersurface 97 of collar 23d.

In Figures 7 and 8, I have shown a modified form of clamping means for the food tanks. This form of the clamping means is similar in construction to that disclosed in connection with the device of Figure 1 in that it includes a substantially inverted U-shaped member 70a having a transversely extending portion 71a and downwardly extending legs 73a, the lower end of these legs having the inturned flanges 74a for engaging beneath flange 60a of the lowermost food tank 59a. The transverse portion 71a of clamping member 70a is also provided with a yieldable insulating knob 81a, which is secured thereto in the same manner as set out in connection with the device of Figure 1. It will be noted, however, that in this form of the device the washer 75a does not seat in a depression formed in the closure member of the food tanks. Instead, this form of the clamping means has been provided with a second strap 99 to prevent lateral movement of said clamping means with respect to the food tanks. This strap is secured to transverse portion 71a of the clamping means by being confined between the washer 75a and the transverse portion 71a of clamping means 70a. As shown, the central portion of strap 99 is pressed upwardly to provide a recess 100 for reception of washer 75a. At its outer ends, strap 99 is turned upwardly and then outwardly to form a flange 102. The upturned portion 101 of strap 99 bears against the upturned portion 65a of closure member 64a and flange 102 of strap 99 seats upon flange 67a of closure member 64a. As the upturned portion 101 of strap 99 bears against the upturned portion 65a of closure member 64a, and because of the curvature of said closure member, said clamping means will be effectively prevented against lateral movement with respect to said food tanks. It will also be noted, in the instant form of the device, that the food tanks 57a to 59a are each necked in, at 105, so as to dispose the flanges 60a of such tanks within the plane of the side walls 106 thereof. This clamp is operated in the same manner as described in connection with the clamp of Figures 1 and 2.

Figures 9 and 10 show another modified form of clamping means for the food tanks. This form of the clamping means comprises a strap 108 which is adapted to extend across the closure member 64b of the topmost food tank 57b. This strap is provided with a yieldable handle 81b, secured thereto in substantially the same manner as set out in connection with the device of Figure 1. At its outer ends strap 108 is turned upwardly, as indicated at 109, and then turned outwardly and downwardly to form depending ears or lugs 110. These ears or lugs 110 are adapted to have one end of a spring 111 fixedly secured thereto at 112. These springs are ordinary tension springs, and at their free ends are adapted to engage over studs or bosses 113, which are rigidly secured to the lowermost food tank 59b and extend outwardly from the side walls thereof. The portion 114 of strap 108, disposed between upturned portion 109 and ear 110, normally seats on the flange 67b of the closure member 64b, and the upturned portion 109, seating within the depressed portion 66b of closure member 64b and abutting against the upturned portion 65b thereof, serves to prevent lateral movement of said strap with respect to said tanks and closure member. When it is desired to remove the clamping means from the tanks it is only necessary to release springs 111 from the bosses 113 and to lift the clamping means off of the tanks. In this form of the device the lower food tank 59b is preferably provided with a plurality of insulated feet 116 secured thereto by rivets 117, which feet seat in an annular channel 118 formed in bottom wall 7e of inner liner 5e. The feet serve to support the tanks out of contact with the bottom wall of liner 5e and the channel 118 serves to prevent lateral movement of said tanks into engagement with the side walls of said liner. If desired, the plurality of insulated feet 116' may be an integral part of liner 5e and the annular recess or channel 118' may be formed in the bottom wall of the food tanks, as shown in Figure 11.

As will be understood by those skilled in the art, while I have shown certain preferred embodiments of my invention I do not wish to be limited thereto, since changes may be made therein without departing from the spirit and scope of the invention.

What I claim is:

1. In a lunch box, the combination with an outer casing, a liner secured within the casing and thermally insulated therefrom, and a closure member for said liner, of a plurality of nested food tanks disposed in said liner, clamping means yieldingly urging said tanks together, means supporting said tanks in said liner and out of contact with the side and bottom walls thereof, and an insulating knob mounted upon and carried by said clamping means and cooperating with said closure member for holding said clamping means and said tanks out of contact with said closure member and the upper portion of the walls of said liner in any position of the lunch box.

2. In combination, in a device of the character described, an outer casing, a liner secured within the casing and thermally insulated therefrom, a plurality of tanks disposed in said liner, and means comprising a single centrally located point of support formed integrally with said liner and cooperating with said tanks for supporting said tanks out of direct contact with the bottom wall of the liner and restraining lateral movement of said tanks toward said liner in any position of the device.

3. The combination with a plurality of nested and stacked food tanks, of means securing said tanks together, comprising a strap seating on one of said tanks and terminating adjacent the upper end of the lowermost food tank, and cooperating flanges formed on the lowermost food tank and on said strap and engageable by relative upward and inward movement of the strap with respect to said tanks to thereby secure said strap to said tanks.

4. The combination with a plurality of nested food tanks, of means securing said tanks together, comprising a strap seating on one of said tanks, flanges formed on said strap, studs extending outwardly from another of sand tanks, and tension springs connected between said flanges and said studs for clamping said tanks together.

5. In a lunch box, the combination with an outer casing, a metal liner disposed within the casing and thermally insulated therefrom, a closure member for said liner, and a plurality of nested food tanks disposed in said liner, of means supporting said tanks within said liner and comprising a support associated with said tanks and said liner and a support associated with said tanks and said closure member, one of said supports comprising a translationally movable member normally maintained under pressure to thereby normally urge said tanks together and both of said supports being effective to maintain said tanks thermally insulated from the walls of said liner.

6. In a lunch box, the combination with an outer casing, a liner disposed within the casing and thermally insulated therefrom, a closure member for said liner, and a plurality of nested food tanks disposed in said liner, of means supporting said tanks within said liner and comprising a single centrally located point of support associated with said tanks and said liner and a single centrally located point of support associated with said tanks and said closure member, one of said supports including means normally urging said tanks together.

7. In a lunch box, the combination with an outer casing, a liner disposed within the casing and thermally insulated therefrom, a closure member for said liner, and a plurality of nested food tanks disposed in said liner, of means supporting said tanks within said liner and comprising a single centrally located point of support associated with said tanks and said liner and a single centrally located point of support associated with said tanks and said closure member, said last named point of support including means normally urging said tanks together.

8. In a lunch box, the combination with an outer casing, a liner within the casing and thermally insulated therefrom, and a closure member for said liner, of a plurality of nested food tanks, clamping means maintaining said tanks in nested relationship, said food tanks and said clamping means being disposed in said liner and spaced from the walls thereof, and means including a spring actuated knob carried by said clamping means and cooperating with said closure member to support and maintain said tanks and said clamping means spaced from the walls of said liner.

9. In a lunch box, the combination with an outer casing, a liner within the casing and thermally insulated therefrom, and a closure member for said liner, said closure member being provided with a recess, of a plurality of nested food tanks, clamping means yieldingly urging said tanks together, said food tanks and said clamping means being disposed in said liner in spaced relationship with respect to the walls thereof, means supporting and maintaining said lowermost tank spaced from the bottom and side wall of said liner, and means carried by said clamping means and engageable in the recess in said closure member to support and maintain the uppermost tank and said clamping means spaced from the closure member and the side wall of said liner.

10. The combination with a plurality of nested food tanks, each of said tanks being provided with an outwardly extending peripheral flange on the open edge thereof, of means comprising a single relatively narrow substantially U-shaped strap having its transverse portion seating on the uppermost food tank, and a flange formed on the free end of each leg of said strap and engageable with the flange on the lowermost food tank by relative inward and upward movement with respect thereto for securing said strap to said tanks.

JAMES H. DEVINE.